United States Patent
Wang et al.

(10) Patent No.: US 10,148,372 B2
(45) Date of Patent: *Dec. 4, 2018

(54) EMERGENCY INFORMATION IN SYSTEM INFORMATION BROADCAST

(71) Applicant: InterDigital Patent Holdings, Inc., Wilmington, DE (US)

(72) Inventors: Peter S. Wang, East Setauket, NY (US); Guodong Zhang, Syosset, NY (US); Shankar Somasundaram, Sunnyvale, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,982

(22) Filed: Nov. 13, 2017

(65) Prior Publication Data

US 2018/0069643 A1 Mar. 8, 2018

Related U.S. Application Data

(63) Continuation of application No. 14/671,072, filed on Mar. 27, 2015, now Pat. No. 9,819,427, which is a
(Continued)

(51) Int. Cl.
*H04M 11/04* (2006.01)
*H04H 20/59* (2008.01)
(Continued)

(52) U.S. Cl.
CPC ............ *H04H 20/59* (2013.01); *H04H 20/72* (2013.01); *H04W 4/90* (2018.02); *H04W 76/50* (2018.02); *H04W 28/06* (2013.01); *H04W 48/10* (2013.01)

(58) Field of Classification Search
CPC ... H04L 12/189; H04L 1/1887; H04L 1/0001; H04L 47/762; H04L 5/0032;
(Continued)

(56) References Cited

U.S. PATENT DOCUMENTS

| | | | |
|---|---|---|---|
| 5,414,432 | A | 5/1995 | Penny et al. |
| 5,495,283 | A | 2/1996 | Cowe |

(Continued)

FOREIGN PATENT DOCUMENTS

| | | |
|---|---|---|
| WO | 07/045564 | 4/2007 |
| WO | 07/057031 | 5/2007 |
| WO | 09/001288 | 12/2008 |

OTHER PUBLICATIONS

LG Electronics, "ETWS Support in Release 8," 3GPP TSG-RAN WG2 #61 bis, R2-081515 (Mar. 31-Apr. 4, 2008).
(Continued)

*Primary Examiner* — Nimesh Patel
(74) *Attorney, Agent, or Firm* — Volpe and Koenig, P.C.

(57) ABSTRACT

A method and apparatus for handling emergency information for a wireless transmit receive unit (WTRU). The WTRU configured to receive scheduling information and receive a first transmission with a plurality of earthquake and tsunami warning system (ETWS) sub-system information blocks (sub-SIBs) of a first part of a ETWS-SIB based on the scheduling information, wherein the plurality of ETWS sub-SIBs of the first part include segments of a secondary ETWS message. The WTRU is further configured to receive a second transmission of a plurality of ETWS sub-SIBs of a second part of the second ETWS-SIB interspersed with non-EWTS system information, wherein the plurality of ETWS sub-SIBs of the second part include segments of the secondary ETWS message. The WTRU is further configured to recover the secondary ETWS message
(Continued)

from the first and second part of the second ETWS-SIB and then display the recovered secondary ETWS message via a user interface.

10 Claims, 4 Drawing Sheets

Related U.S. Application Data continuation of application No. 12/486,029, filed on Jun. 17, 2009, now Pat. No. 9,008,605.

(60) Provisional application No. 61/074,229, filed on Jun. 20, 2008.

(51) Int. Cl.
| | |
|---|---|
| *H04H 20/72* | (2008.01) |
| *H04W 76/50* | (2018.01) |
| *H04W 4/90* | (2018.01) |
| *H04W 28/06* | (2009.01) |
| *H04W 48/10* | (2009.01) |

(58) Field of Classification Search
CPC ..... H04L 5/0073; H04L 67/18; H04L 5/0007; H04L 5/0053; H04L 12/18; H04L 65/4076; H04L 41/0853; H04L 41/12; H04L 41/145; H04L 41/147; H04L 41/5009; H04L 1/0007; H04L 1/0014; H04L 1/0071; H04L 45/44; H04L 47/365; H04L 47/14; H04L 47/36; H04W 72/042; H04W 4/22; H04W 76/007; H04W 4/005; H04W 68/00; H04W 4/06; H04W 4/021; H04W 68/005; H04W 48/12; H04W 48/08; H04W 72/1289; H04W 28/06; H04W 88/02; H04H 20/59; H04H 20/72; H04H 20/71; G11B 2020/1238; G11B 2020/1277; G11B 20/1258; G11B 5/581

See application file for complete search history.

(56) References Cited

U.S. PATENT DOCUMENTS

| | | | | |
|---|---|---|---|---|
| 6,169,476 | B1 | 1/2001 | Flanagan | |
| 8,599,802 | B2* | 12/2013 | Sammour | H04W 4/22 370/312 |
| 9,008,605 | B2* | 4/2015 | Wang | H04W 4/22 455/3.01 |
| 9,167,402 | B2* | 10/2015 | Sammour | H04W 4/22 |
| 9,648,480 | B2* | 5/2017 | Sammour | H04W 4/22 |
| 9,819,427 | B2* | 11/2017 | Wang | H04H 20/59 |
| 2004/0213291 | A1 | 10/2004 | Beshai et al. | |
| 2005/0037728 | A1 | 2/2005 | Binzel et al. | |
| 2005/0135398 | A1 | 6/2005 | Muthukrishnan et al. | |
| 2006/0160522 | A1 | 7/2006 | Jennings | |
| 2006/0281456 | A1 | 12/2006 | Roberts et al. | |
| 2009/0233634 | A1 | 9/2009 | Aghili et al. | |
| 2009/0239498 | A1 | 9/2009 | Lee et al. | |
| 2009/0239554 | A1 | 9/2009 | Sammour et al. | |
| 2009/0253401 | A1 | 10/2009 | Lee et al. | |
| 2010/0035574 | A1 | 2/2010 | Punz | |
| 2010/0159870 | A1 | 6/2010 | Jokinen | |
| 2010/0273506 | A1 | 10/2010 | Stern-Berkowitz et al. | |
| 2011/0250862 | A1 | 10/2011 | Schliwa-Bertling et al. | |

OTHER PUBLICATIONS

LG Electronics, "ETWS Support in Release 8," 3GPP TSG-RAN WG2 #62, R2-082431 (May 5-9, 2008).
Nokia Corporation et al., "ETWS in E-UTRAN Rel 8," 3GPP TSG-RAN WG2 Meeting #62, R2-082441 (May 5-9, 2008).
Nokia Corporation et al., "System Information segmentation," 3GPP TSG-RAN WG2 Meeting #63, R2-084496 (Aug. 2008).
NTT Docomo, Inc., "Proposals for ETWS Air Interface for Rel-8 EUTRAN," 3GPP TSG RAN WG2 #62, Kansas City, Missouri, USA, R2-082429 (May 5-9, 2008).
Panasonic, "ETWS support in Rel-8," 3GPP TSG RAN WG2 #61 bis, R2-082231 (Mar. 31-Apr. 4, 2008).
Sesia et al., "LTE—The UMTS Long Term Evolution: From Theory to Practice," 1$^{st}$ Edition (Feb. 2009).
Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.40 (Mar. 2008).
Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.80 (Mar. 2009).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.2.0 (May 2008).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.5.0 (Mar. 2009).
Third Generation Partnership Project, "Technical Specification Group Services and System Aspects; Earthquake and Tsunami Warning System (ETWS) Requirements; Stage 1 (Release 8)," 3GPP TS 22.168 V1.2.1 (Jan. 2008).
Third Generation Partnership Project, "Technical Specification Group Radio Access Network; Evolved Universal Terrestrial Radio Access (E-UTRA) and Evolved Universal Terrestrial Radio Access Network (E-UTRAN); Common test environments for User Equipment (UE); Conformance testing (Release 8)," 3GPP TS 36.508 V0.1.0 (May 2008).
Third Generation Partnership Project, "Technical Specification Group Radio Access Network; Evolved Universal Terrestrial Radio Access (E-UTRA) andEvolved Packet Core (EPC); Common test environments for User Equipment (UE) conformance testing (Release 8)," 3GPP TS 36.508 V8.2.1 (Jun. 2009).
Third Generation Partnership Project, "Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 8)," 3GPP TS 36.523-1 V8.2.1 (Jun. 2009).
Third Generation Partnership Project, "Technical Specification Group Services and System Aspects; Earthquake and Tsunami Warning System (ETWS) Requirements; Stage 1 (Release 8)," 3GPP TS 22.168 V8.1.0 (Jun. 2008).
Nokia Corporation et al., "System Information offset and transmission window," 3GPP TSG-RAN RRC Adhoc Meeting, R2-083001 (Jun. 5-6, 2008).
NTT DOCOMO, Inc., "Summary of email discussion on System Information scheduling," 3GPP TSG RAN WG2 #62, Tdoc-R2-082625, Kansas City, USA, (May 5-9, 2008).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.2.0 (Mar. 2008).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.7.0 (May 2009).
Third Generation Partnership Project, "Technical Specification Group Services and System Aspects; Earthquake and Tsunami Warning System Requirements and Solutions (ETWS); Solution Placeholder (Release 8)," 3GPP TR 23.828 V1.0.0 (Jun. 2008).

\* cited by examiner

EMERGENCY INFORMATION IN SYSTEM INFORMATION BROADCAST

CROSS REFERENCE TO RELATED APPLICATIONS

This application is a continuation of U.S. Non-Provisional Application No. 14/671,072 filed Mar. 27, 2015 and issued as U.S. Pat. No. 9,819,427 on Nov. 14, 2017, which is a continuation of U.S. Non-Provisional Application No. 12/486,029 filed Jun. 17, 2009, which issued on Apr. 14, 2015 as U.S. Pat. No. 9,008,605, which claims the benefit of Provisional Application No. 61/074,229 filed Jun. 20, 2008, which are incorporated by reference as if fully set forth.

FIELD OF INVENTION

This application is related to wireless communications.

BACKGROUND

The Third Generation Partnership Project (3GPP) has initiated the Long Term Evolution (LTE) program to bring new technology, new network architecture, new configurations and new applications and services to wireless networks in order to provide improved spectral efficiency and faster user experiences.

FIG. 1 shows an overview of an Evolved Universal Mobile Telecommunications System (UMTS) Terrestrial Radio Access Network (E-UTRAN) 100 in accordance with the prior art. As shown in FIG. 1, E-UTRAN 100 includes three eNodeBs (eNBs) 102, however, any number of eNBs may be included in E-UTRAN 100. The eNBs 102 are interconnected by an X2 interface 108. The eNBs 102 are also connected by an S1 interface 106 to the Evolved Packet Core (EPC) 104 that includes a Mobility Management Entity (MME) 112 and a Serving Gateway (S-GW) 110.

System information (SI) is information that is broadcast within a cell and provides information about configurations and parameters that are common to at least some of the wireless transmit receive units (WTRUs) in the cell.

System information messages may include parameters such as network identification, neighbouring cells, channel availability and power control requirements, for example.

An LTE network may include a severe earthquake and tsunami warning service (ETWS). The ETWS may warn wireless telephone users of an imminent or nearby man-made or natural disaster. In the LTE radio access network, ETWS information is distributed via system information broadcast.

SUMMARY

A method and apparatus for handling emergency information for a wireless transmit receive unit (WTRU). The WTRU configured to receive scheduling information and receive a first transmission with a plurality of earthquake and tsunami warning system (ETWS) sub-system information blocks (sub-SIBs) of a first part of a ETWS-SIB based on the scheduling information, wherein the plurality of ETWS sub-SIBs of the first part include segments of a secondary ETWS message. The WTRU is further configured to receive a second transmission of a plurality of ETWS sub-SIBs of a second part of the second ETWS-SIB interspersed with non-EWTS system information, wherein the plurality of ETWS sub-SIBs of the second part include segments of the secondary ETWS message. The WTRU is further configured to recover the secondary ETWS message from the first and second part of the second ETWS-SIB and then display the recovered secondary ETWS message via a user interface.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the term "wireless transmit/receive unit (WTRU)" includes, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the term "base station" includes, but is not limited to, a Node B, a site controller, an access point (AP), or any other type of interfacing device capable of operating in a wireless environment.

Figure 1:
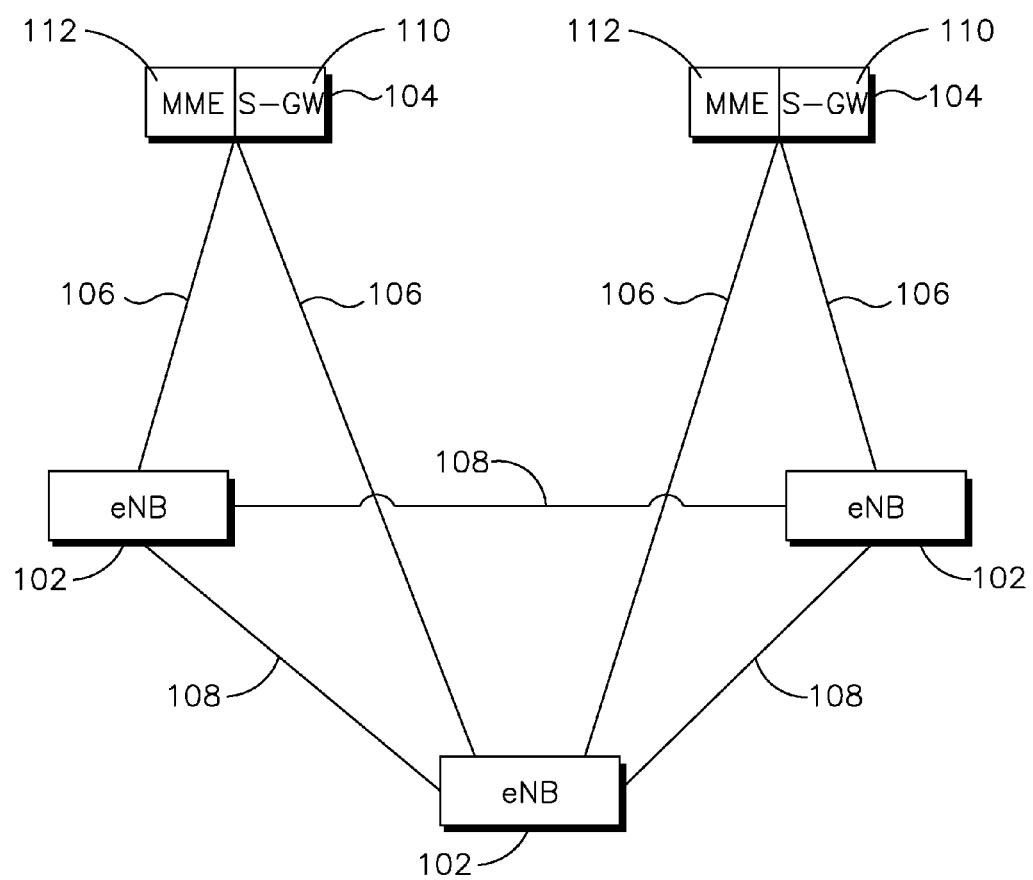
FIG. 1 shows an overview of an E-UTRAN in accordance with the prior art.
Figure 2:
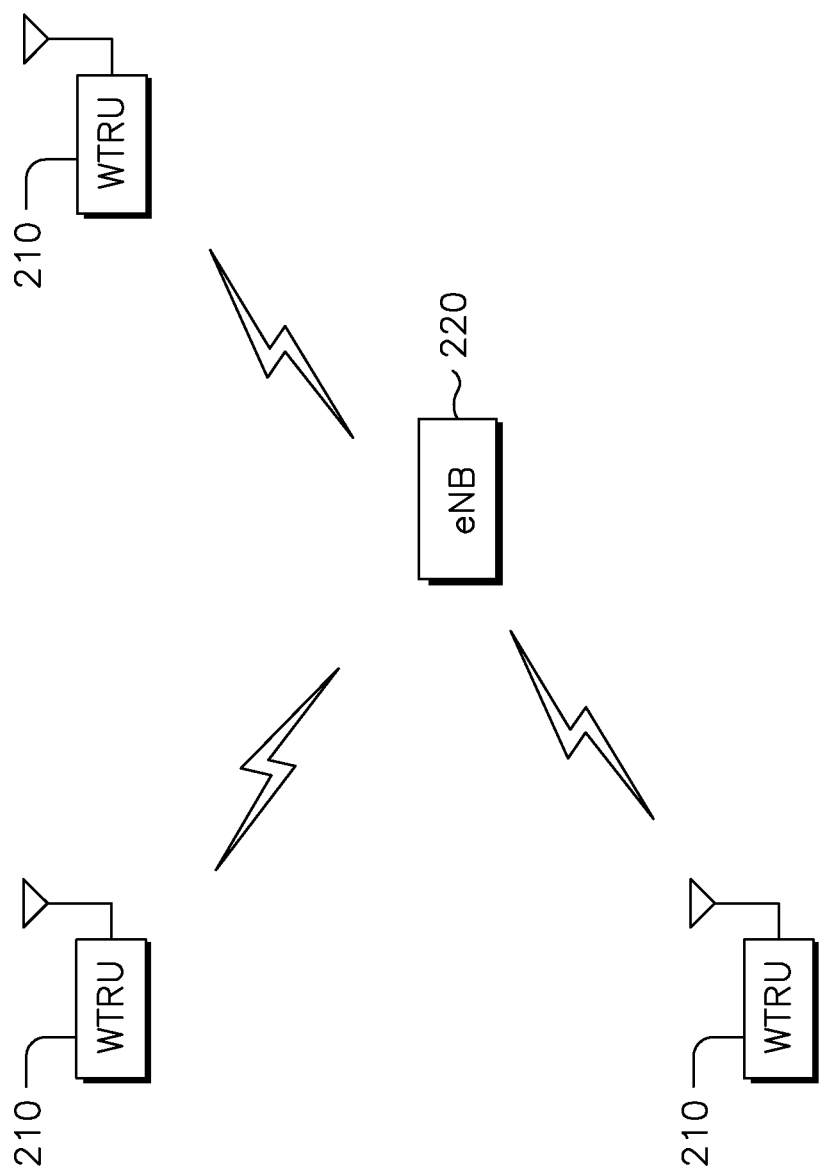
FIG. 2 shows an example wireless communication system including a plurality of WTRUs and an eNB in accordance with one embodiment.

FIG. 2 shows a wireless communication system 200 including a plurality of WTRUs 210 and an e Node B (eNB) 220. As shown in FIG. 2, the WTRUs 210 are in communication with the eNB 220. Although three WTRUs 210 and one eNB 220 are shown in FIG. 2, it should be noted that any combination of wireless and wired devices may be included in the wireless communication system 200.

Figure 3:
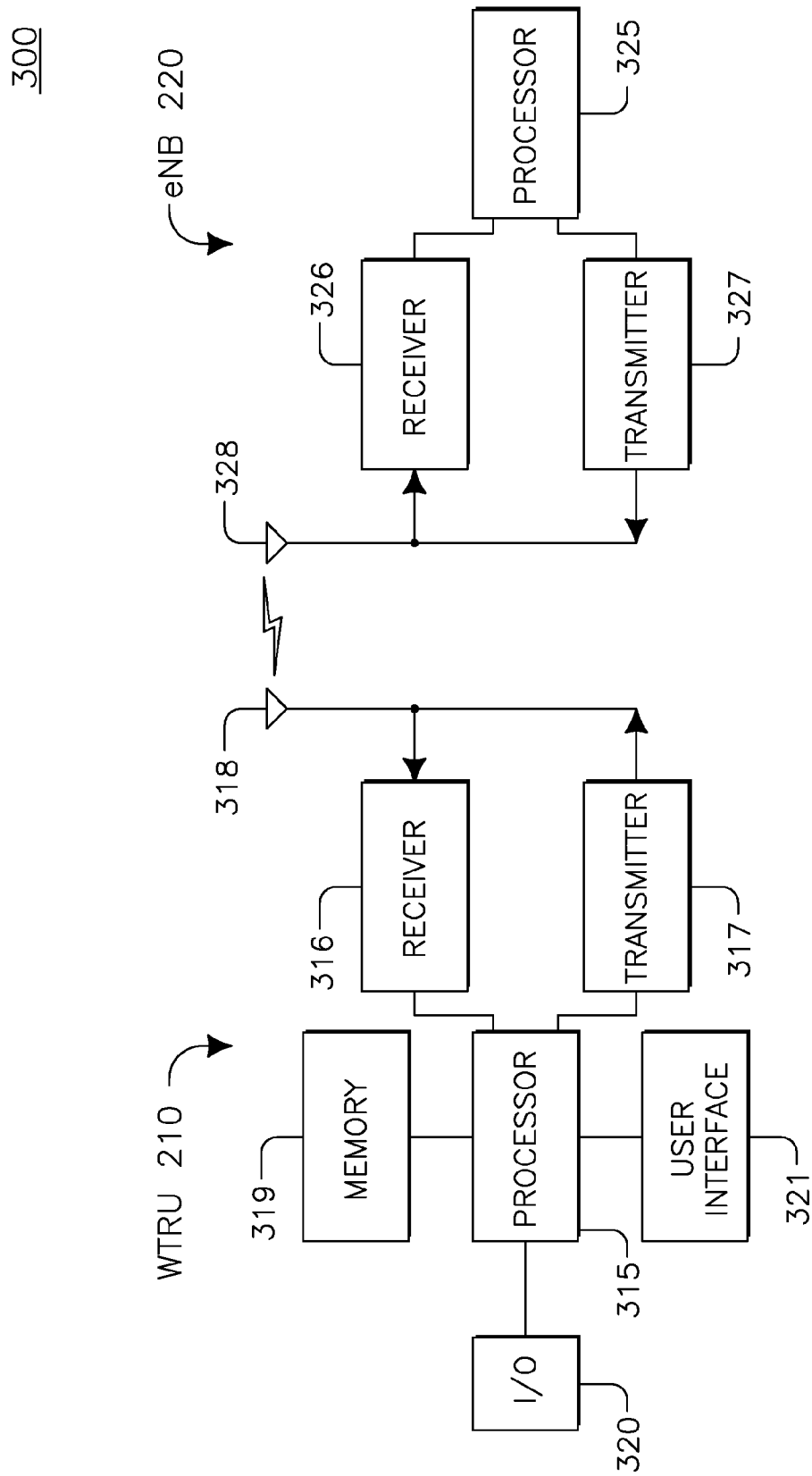
FIG. 3 is a block diagram of a WTRU and the eNB of FIG. 2.

FIG. 3 is a functional block diagram 300 of a WTRU 210 and the eNB 220 of the wireless communication system 200 of FIG. 2. As shown in FIG. 2, the WTRU 210 is in communication with the eNB 220. The WTRU 210 is configured to receive and process emergency and non-emergency SI messages.

In addition to the components that may be found in a typical WTRU, the WTRU 210 includes a processor 315, a receiver 316, a transmitter 317, and an antenna 318. The WTRU 210 may also include a user interface 321, which may include, but is not limited to, an LCD or LED screen, a touch screen, a keyboard, a stylus, or any other typical input/output device. The WTRU 210 may also include memory 319, both volatile and non-volatile as well as interfaces 320 to other WTRU's, such as USB ports, serial ports and the like. The receiver 316 and the transmitter 317 are in communication with the processor 315. The antenna 318 is in communication with both the receiver 316 and the transmitter 317 to facilitate the transmission and reception of wireless data.

In addition to the components that may be found in a typical eNB, the eNB 220 includes a processor 325, a receiver 326, a transmitter 327, and an antenna 328. The receiver 326 and the transmitter 327 are in communication with the processor 325. The antenna 328 is in communication with both the receiver 326 and the transmitter 327 to facilitate the transmission and reception of wireless data. The eNB 220 is configured to transmit and process emergency and non-emergency SI messages.

A natural or man-made disaster may occur within an area that is served by a wireless telephone service. Users located in a particular serving cell area may require immediate information and/or evacuation. If so, emergency system information messages may be used to transmit emergency instructions and information to users in the affected areas, such as evacuation information, for example. The emergency system information messages may also be used to inform users adjacent to the evacuation area that an emergency is occurring, and to inform users who are located in an area not directly affected by the emergency, but who may require information updates regarding the disaster.

The system information can include an emergency information indicator. The emergency information indicator may be, for example, a flag, a particular bit or string of bits that may indicate the type of emergency information being received by the WTRU. The emergency information indicator may be placed, for example, in the cell entries in the neighboring cell list or a block list.

Emergency information may require larger data bandwidth for possible disaster handling, that is, more resource blocks, than non-emergency information. Due to the relatively large size of emergency information, a WTRU may require larger resources to receive the necessary emergency information. Emergency information indicators are carried in system information, which is carried on a downlink shared channel, such as the physical downlink shared channel (PDSCH), for example. Resources for the PDSCH are carried on a downlink control channel, such as the physical downlink control channel (PDCCH). The resource scheduling for emergency information may be different than the scheduling required for non-emergency information due to the relatively large size of the emergency information. This may require the use of a number scale representation or format that is different from that used for non-emergency information resource scheduling.

Therefore a specialized ETWS radio network temporary identifier (ETWS_RNTI) may be used with emergency information notification, and may be used to obtain the PDSCH resources for reading the system information blocks (SIBs) carrying emergency information notification. A radio network temporary identifier (RNTI) may be used to identify a WTRU when a radio resource control (RRC) connection is present, or used to identify special network service information available to all the WTRUs. The ETWS_RNTI may be used to identify to all WTRUs that network or public emergency information is available for retrieval. As emergency information may be broadcast with a primary notification and a secondary notification, the ETWS_RNTI may be used to receive emergency information when the primary ETWS notification is on, and may take higher priority than other RNTI signal processing.

Non-emergency SIB transmission is periodic. Emergency information SIB transmission may also have a particular period ($T_{ETWS-SI}$). The period may be at least, for example, 128 or 256 frames, so that transmission is easier to and to accommodate potential retransmission segments. Furthermore, the emergency information SI transmission may employ a voluntary retransmission scheme that automatically sends redundant information without waiting for a negative acknowledgement signal (NACK) so that each WTRU can reliably receive the emergency information SIB(s) in one defined period.

Non-emergency SI messages are transmitted within periodically occurring time domain windows using dynamic scheduling. Each SI message is associated with a SI-window. SI-windows containing different SI messages do not overlap. That is, within one SI-window only the corresponding SI message is transmitted. The length of the SI-window is common for all SI messages, and is configurable. Within the SI-window, the corresponding SI message can be transmitted a number of times in any subframe. The WTRU may acquire the detailed time and frequency domain scheduling from decoding the SI-RNTI on the PDCCH.

In one embodiment, emergency SI messages may be scheduled in a non-overlapping manner, which means that emergency SI messages and non-emergency SI messages are not transmitted simultaneously. Non-overlapping emergency SI message transmission may be scheduled at the same time, interleaved as segments, as with non-emergency SI message transmission. The emergency SI messages may be carried in relatively small consecutive sub-frames that are not significantly larger than the non-emergency SI transmission window length. The transmission of emergency SI messages may be scheduled according to the formula:

$$SFN \bmod T_{ETWS-SI}=0 \text{ and } X=(n-1)*Y; \quad \text{Equation (1)}$$

wherein $T_{ETWS-SI}$ is the emergency SI message periodicity, X is the non-emergency SI message offset, n is the number of non-emergency SI messages and Y is periodicity of the non-emergency SI messages.

The emergency SI information messages may be placed in at the end of the non-emergency SI messages. Alternatively, the emergency SI messages can be placed in the beginning or in the middle of the non-emergency messages. The location of the emergency SI messages may be signaled to the WTRU in a system information block, such as SIB-1, for example.

An offset (ETWS_Offset denoted as $X_{ETWS-SI}$) can be applied to the emergency SI messages. The ETWS_Offset allows the transmission of the emergency SI messages without overlapping non-emergency SI messages.

$$SFN \bmod T_{ETWS-SI}=X_{ETWS-SI} \quad \text{Equation (2)}$$

where the $X_{ETWS-SI}$ is a frame offset [0, . . . , P] for the emergency SI messages and P is the shortest periodicity among all SIs. The $X_{ETWS-SI}$ could be signaled from the network.

Figure 4:
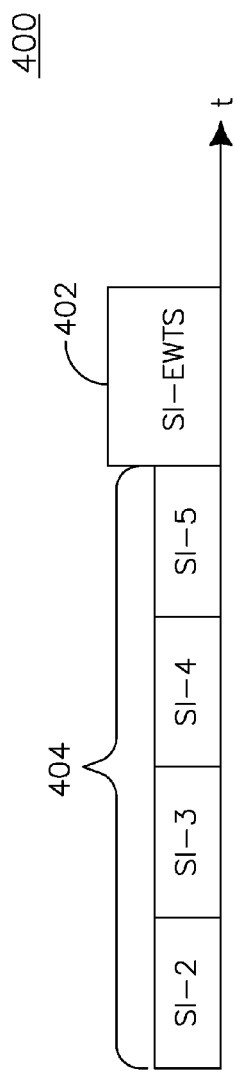
FIG. 4 shows a method of non-overlapping emergency SI message transmission in accordance with one embodiment.

FIG. 4 shows a method of non-overlapping emergency SI messages transmission 400 in accordance with one embodiment. The emergency SI messages 402 are transmitted after the non-emergency SI messages 404.

Alternatively, emergency SI messages may be transmitted up to a point where the non-emergency SI messages begin. No offset is required. If there are more emergency SI messages to be transmitted after the non-emergency SI message point is reached, the balance of the emergency SI messages may be transmitted as segments between the non-emergency SI messages. The emergency SI message segments may be transmitted in sub-frames in the $T_{ETWS-SI}$ period that do not contain non-emergency SI messages. The WTRU may receive a signal from a network node, such as an eNodeB, for example, that contains an indication as to which of the sub-frames to use. The indication may be a bitmap, for example. Alternatively, the WTRU may receive the indication in a primary ETWS notification message or an SIB, such as SIB-1 for example.

The Tx-window-size for emergency SI messages ($Y_{ETWS-SI}$) can be made equal to or less than the Tx-window size of non-emergency SI messages (Y) if more frequency spectrum bandwidth, or resource blocks (RBs), can be assigned to transmit the emergency SI messages. $Y_{ETWS-SI}$ can be signaled and transmitted in an SIB, such as SIB-1, for example. It may be signaled only when the primary ETWS notification is activated or can be always be part of the SIB. Alternatively, $Y_{ETWS-SI}$ can also be sent in the primary ETWS notification message or in a paging message used to indicate that a change in system information is upcoming.

If the emergency SI messages are scheduled to be transmitted in the beginning or in the middle of the non-emergency SI messages, and $Y_{ETWS-SI}$ is not the same as Y, then the offset X=(n−1)*Y can be computed as:

$$X=(n-2)*Y \text{ for } n \text{ before } n' \text{ of the ETWS SI, or}$$

$$X=(n'-2)*Y+Y_{ETWS-SI}+(n-1-n')*Y; \text{ for } n \text{ after } n'.$$

In another embodiment, emergency SI messages may be broadcast overlapped with non-emergency SI messages. This means that an anticipated large volume of emergency data may be handled by WTRUs configured to receive emergency SI messages while the WTRU is also receiving a non-emergency signal.

Transmission of emergency SI messages may be concentrated or distributed. If the transmission is concentrated, consecutive sub-frames may be equal to or larger than Y, the non-emergency SI Tx-window-size. The scheduling of emergency SI messages may not be restricted by non-emergency SI messages, as defined by the equation:

$$SFN \bmod T_{ETWS-SI}=X_{ETWS-SI},$$

where $X_{ETWS-SI}$ is a frame offset (0, . . . , P).

If transmission of emergency SI messages is distributed, the emergency SI messages may be segmented into SIBs and/or sub-SIBs based on the content and size of the emergency SI message. The emergency information SI transmission unit may use M consecutive sub-frames with J RBs each, where M and J are integers, such that the amount of data transmitted equals J*M for each emergency information receiving occasion. The total size of the emergency SI message includes the size of any retransmission redundancy, if scheduled. The number of reception occasions ($O_{ETWS-IS}$) equals ceiling[total ETWS-SI size div (J*M)]. If J varies, then the number of reception occasions equals ceiling[($T_{ETWS-SI}\times 10$) div M in subframes].

Figure 5:
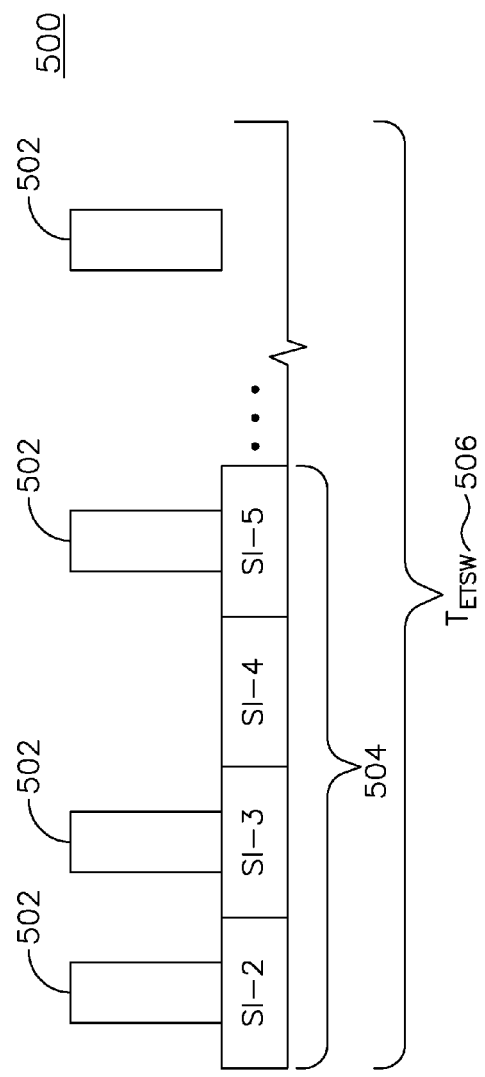
FIG. 5 shows a method of overlapping transmission of emergency SI messages in accordance with another embodiment.

FIG. 5 shows a method of overlapping transmission of emergency SI messages 500 in accordance with another embodiment. The emergency SI messages 502 are segments and are evenly distributed throughout the emergency SI message period $T_{ETWS}$ 506. The emergency SI messages 502 are overlapped with the non-emergency SI messages 504.

The distance between the start of two emergency information Tx-windows between repeat transmission occasions is known as the Occasion frame offset (ETWS-OF). In units of sub-frames, ETWS-OF=($T_{ETWS-SI}$*10) div $O_{ETWS-IS}$. Alternatively, the ETWS-OF may be configured such that ETWS-OF*($O_{ETWS-IS}$)<=($T_{ETWS-SI}$*10).

The reception occasions for a WTRU are at frames, starting at SFN mod $T_{ETWS-SI}=X_{ETWS-SI}$, defined by the equation:

$$[X_{ETWS-SI}, X_{ETWS-SI}+(O_{ETWS-IS}-1)*ETWS-OF/10, X_{ETWS-SI}+(2*ETWS-OF)/10, X_{ETWS-SI}+(3*ETWS-OF)/10, \ldots, X_{ETWS-SI}+(O_{ETWS-IS}-1)*ETWS-OF/10].$$

The subframe offset in the respective frame is equal to (n*ETWS-OF) mod 10.

Emergency SI message segments can be transmitted over non-emergency traffic in a specified pattern. The pattern can be signaled in an SIB, such as SIB-1, for example, starting at a frame defined by:

$$SFN \bmod T_{ETWS-SI}=X_{ETWS-SI}.$$

The pattern may be Ax+By+Cz+ . . . where A, B and C . . . are the number of repeated occurrences of offset-x, offset-y and offset-z respectively, such that A+B+C>=$O_{ETWS-IS}$. For example, the signaling may show that A=3, B=1, C=5, x=24, y=40, z=38. This indicates that from the start, there will be three transmission occurrences in occurrence group A. The start of the second occurrence in occurrence group A is 24 sub-frames from the beginning of the first occurrence. There is one occurrence in occurrence group B, which is 40 sub-frames from the beginning of the last occurrence of occurrence group A, and the five occurrences in occurrence group C are each 38 sub-frames from the beginning of the last occurrence. Given the patterned distribution, one ETWS-RNTI may be able to describe all emergency SI message reception occasions and resource block (RB) allocations. It is used only when the primary ETWS notification is ON.

The PDCCH format to describe the ETWS-SI resources can be in a format similar to PDCCH format 1C, which is currently used to for random access channel (RACH) response, paging, and notification of dedicated broadcast channel (D-BCH). The PDCCH format used for the ETWS-SI will multiply the ETWS-RNTI on the cyclic redundancy check (CRC) of the PDDCH. Hence, when the UE decodes the PDCCH, it can verify whether their PDCCH is addressed to the ETWS-RNTI.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for use in a wireless transmit/receive unit (WTRU), the method comprising:
receiving scheduling information;
receiving a first transmission with a plurality of earthquake and tsunami warning system (ETWS) sub-system information blocks (sub-SIBs) of a first part of an ETWS-SIB based on the scheduling information, wherein the plurality of ETWS sub-SIBs of the first part include segments of a secondary ETWS message;
receiving a second transmission of a plurality of ETWS sub-SIBs of a second part of the ETWS-SIB interspersed with non-ETWS system information based on the scheduling information, wherein the plurality of ETWS sub-SIBs of the second part include segments of the secondary ETWS message;
recovering the secondary ETWS message from the first part of the ETWS-SIB and the second part of the ETWS-SIB; and
displaying the recovered secondary ETWS message.

2. The method of claim 1, wherein the secondary ETWS message is carried on a downlink shared channel.

3. The method of claim 1, wherein the secondary ETWS message is sent periodically.

4. The method of claim 1, further comprising receiving a paging message indicating the secondary ETWS message.

5. The method of claim 1, wherein at least one bit indicates the type of message of the secondary ETWS message.

6. A wireless transmit/receive unit (WTRU) comprising:
a receiver coupled to a processor, the receiver and processor configured to receive scheduling information and receive a first transmission with a plurality of earthquake and tsunami warning system (ETWS) sub-system information blocks (sub-SIBs) of a first part of a ETWS-SIB based on the scheduling information, wherein the plurality of ETWS sub-SIBs of the first part include segments of a secondary ETWS message;
the receiver and processor further configured to receive a second transmission of a plurality of ETWS sub-SIBs of a second part of the ETWS-SIB interspersed with non-ETWS system information, wherein the plurality of ETWS sub-SIBs of the second part include segments of the secondary ETWS message;
a memory coupled to the processor, the memory and processor configured to store the scheduling information, the first transmission, and the second transmission and recover the secondary ETWS message from the first part of the ETWS-SIB and the second part of the ETWS-SIB; and
a user interface configured to display the recovered secondary ETWS message.

7. The WTRU of claim 6, wherein the secondary ETWS message is carried on a downlink shared channel.

8. The WTRU of claim 6, wherein the secondary ETWS message is sent periodically.

9. The WTRU of claim 6, wherein the processor and transceiver is further configured to receive a paging message indicating the secondary ETWS message.

10. The WTRU of claim 6, wherein at least one bit indicates the type of message of the secondary ETWS message.

* * * * *